United States Patent
Kubo et al.

[15] 3,641,347
[45] Feb. 8, 1972

[54] APPARATUS FOR DETECTING THE ATTITUDE OF AN ARTIFICIAL SATELLITE

[72] Inventors: Moritada Kubo, Tokyo; Masamichi Shigehara; Yasuo Nogiwa, both of Yokohama, all of Japan

[73] Assignee: Tokyo Shibaura Electric Co., Ltd., Horikawa-cho, Kawashaki-shi, Japan

[22] Filed: July 23, 1970

[21] Appl. No.: 57,448

[30] Foreign Application Priority Data
July 25, 1969 Japan..................44/58383

[52] U.S. Cl...............250/83.3 H, 250/83 R, 250/203 R
[51] Int. Cl..........................................G01j 1/20
[58] Field of Search................250/83.3 H, 203 R

[56] References Cited

UNITED STATES PATENTS

| | | | |
|---|---|---|---|
| 3,090,583 | 5/1963 | Behun et al. | 250/83.3 H |
| 3,525,866 | 8/1970 | Sagalyn et al. | 250/83.3 R |
| 3,535,521 | 10/1970 | Levine | 250/83.3 H |
| 3,188,472 | 6/1965 | Whipple, Jr. | 250/83.3 R |
| 3,427,453 | 2/1969 | Gill et al. | 250/203 R X |
| 3,486,024 | 12/1969 | Astheimer | 250/203 R X |

*Primary Examiner*—Archie R. Borchelt
*Attorney*—Oblon, Fisher and Spivak

[57] ABSTRACT

An artificial satellite includes a pair of sensors for detecting ultraviolet rays from the horizon of the earth. The pair of sensors are mounted on the satellite with a predetermined angle therebetween. When the angle of inclination of the spin axis of the satellite to the horizon thereof is relatively small both of the sensors will simultaneously detect rays from the horizon of the earth. The difference in the outputs of the two sensors will provide a measurement of the inclination angle of the spin axis and hence the attitude of the satellite. On the other hand, when the angle of inclination of the spin axis of the satellite to the horizon thereof is relatively large, one of the pair of sensors will be out of sight of the earth and the output of the other sensor will detect rays from the horizon of the earth to provide a measurement of the inclination angle of the spin axis of the satellite.

4 Claims, 14 Drawing Figures

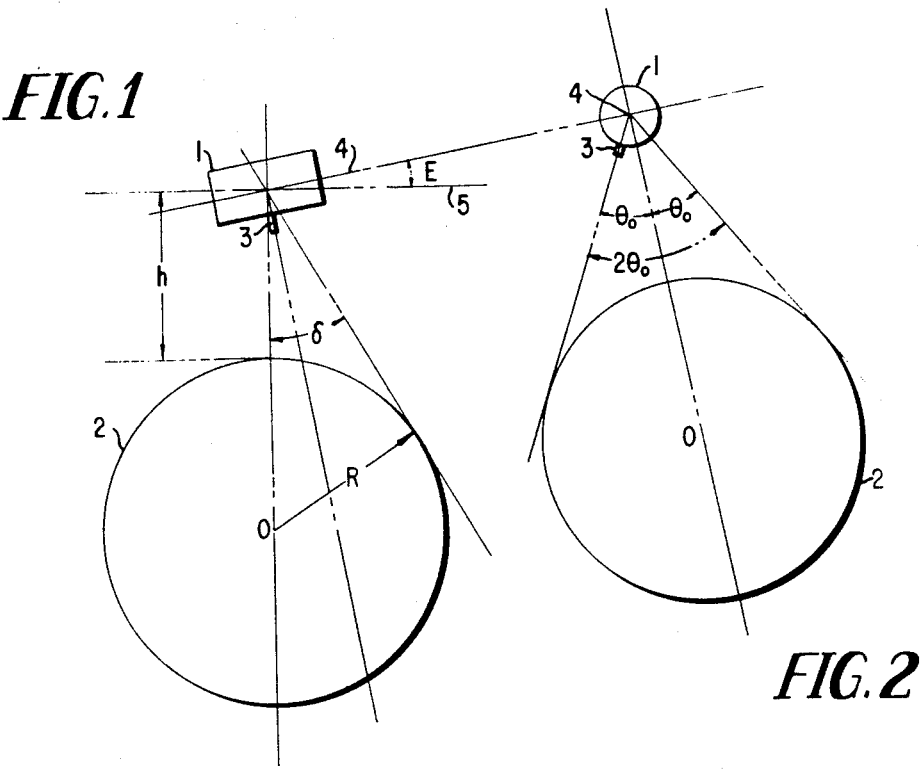
FIG.1
FIG.2
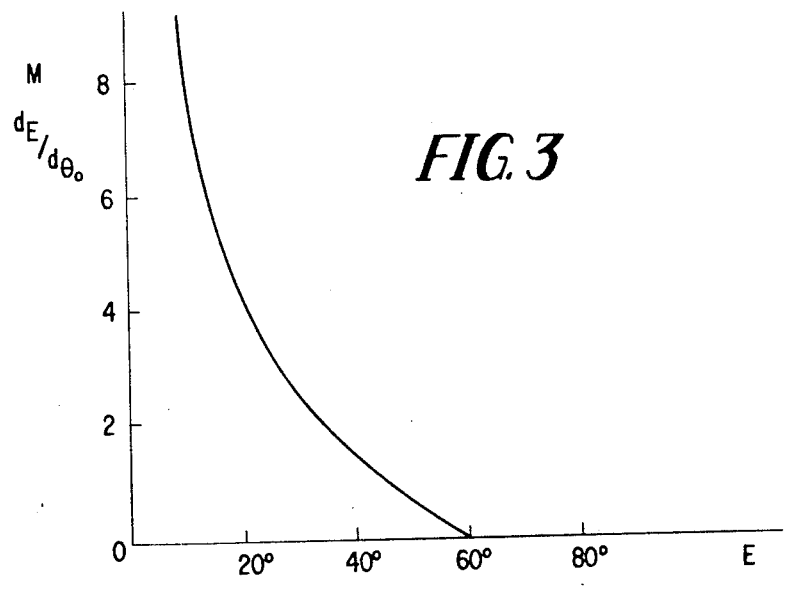
FIG.3

3,641,347

APPARATUS FOR DETECTING THE ATTITUDE OF AN ARTIFICIAL SATELLITE

BACKGROUND OF THE INVENTION

1. Field of the Invention

The present invention generally relates to an apparatus for detecting the attitude of an artificial satellite during the navigation thereof in space and more particularly to an apparatus for detecting the attitude of an artificial satellite during the navigation thereof in space by the utilization of a pair of viewing sensors mounted on the satellite with a predetermined angle therebetween.

2. Description of the Prior Art

FIGS. 1 and 2 show a typical prior art artificial satellite 1 which is in a navigation state around the earth 2. A sensor 3 is mounted on a sidewall of the satellite which is perpendicular to a spin axis 4 of the satellite. The sensor 3 will detect the ultraviolet rays from the horizon of the earth. The inclination angle E of the spin axis of the satellite to the horizon 5 is detected by sensing during the viewing angle $2\theta_o$ which is obtained as the satellite spins. In FIG. 1, $h$ is the height of the satellite, R is the radius of the earth and $\delta$ is an angle between a line extending through the center of the satellite and the center O of the earth and a tangential line from the center of the satellite to the surface of the earth.

In accordance with the prior art, when the inclination angle E of the spin axis 4 of the satellite to the horizon 5 is of a small angle near zero, the ratio of an error $dE$ of the inclination angle E to an error $d\theta_o$ at the output of the horizon sensor 3 will be of a large value. In the following description, the aforesaid ratio $dE/d\theta_o$ is referred to as the magnification M of the error. Moreover, in the prior art, when the inclination angle E increases over an angle that is decided by the height $h$ of the satellite it will become difficult to view the earth 2 by the single sensor 3.

FIG. 3 shows a curve with typical values of the magnification M or $dE/d\theta_o$ which corresponds to the inclination angle E of the spin axis of the satellite to the horizon at the height of 1,000 km.

SUMMARY OF THE INVENTION

Accordingly, it is an object of the present invention to provide a new and improved unique apparatus for detecting the attitude of an artificial satellite.

Another object of the invention is to provide a new and improved apparatus for detecting the attitude of an artificial satellite wherein the magnification of the error will always be of a relatively small value when the inclination angle of the spin axis of the satellite is at an angle near zero.

A further object of the present invention is to provide a new and improved apparatus for detecting the attitude of an artificial satellite without high sensitivity due to the influence of the inclination angle of the spin axis of the satellite.

One other object of the subject invention is to provide a new and improved apparatus for detecting the attitude of an artificial satellite wherein the amount of information needed to be acted upon or transmitted may be reduced.

Briefly, in accordance with this invention, these and other objects are in one aspect obtained by mounting a pair of sensors on the surface of an artificial satellite with a predetermined angle included therebetween. The sensors will detect the ultraviolet rays from the horizon of the earth. The inclination angle of the satellite to the horizon is obtained by measuring the difference between both of the outputs of the sensors during which in turn are responsive to the angle during which each of the sensors views the earth. When one of the sensors is located so that it cannot view the earth, the output of the viewing sensor is employed for sensing the horizon of the earth and for detecting the inclination angle of the satellite to the horizon and, hence, the attitude of the satellite.

BRIEF DESCRIPTION OF THE DRAWINGS

A more complete appreciation of the invention will be readily apparent as the same becomes better understood by reference to the following detailed description when considered in connection with the accompanying drawings wherein;

FIG. 1 is a view showing the relative position between the earth and a prior art artificial satellite navigating around the earth in a plane of the paper, FIG. 2 is a view similar to that of FIG. 1 with the exception that the satellite navigates around the earth in a direction perpendicular to the paper, FIG. 3 is a curve which represents the magnification M of the error of the sensor versus the inclination angle E of the spin axis of the satellite to the horizon at a height of 1,000 km.

FIGS. 11a, 11b, 11c and 11d are views respectively showing procedures for counting the outputs of the sensors.

DETAILED DESCRIPTION OF THE PREFERRED EMBODIMENTS

Figure 4:
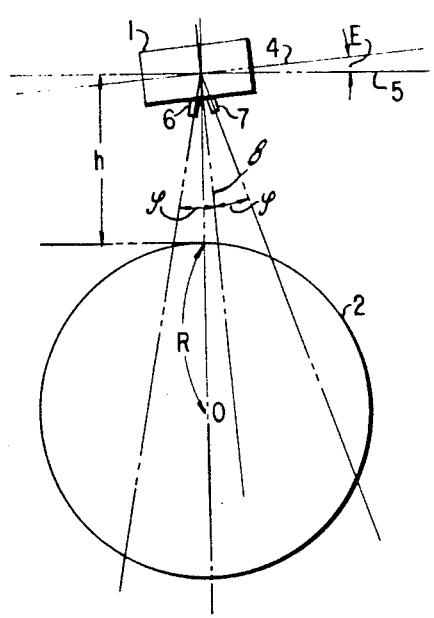
FIG. 4 is a view, in accordance with the present invention, in which the earth is viewed by a pair of sensors on the satellite.

Referring now to the drawings wherein like reference numerals designate identical, or corresponding parts throughout the several views, and more particularly to FIG. 4 thereof wherein an artificial satellite 1 in accordance with the present invention is shown as including a pair of sensors 6 and 7 mounted on the surface thereof with an angle of $2\phi$ therebetween.

Figure 5:
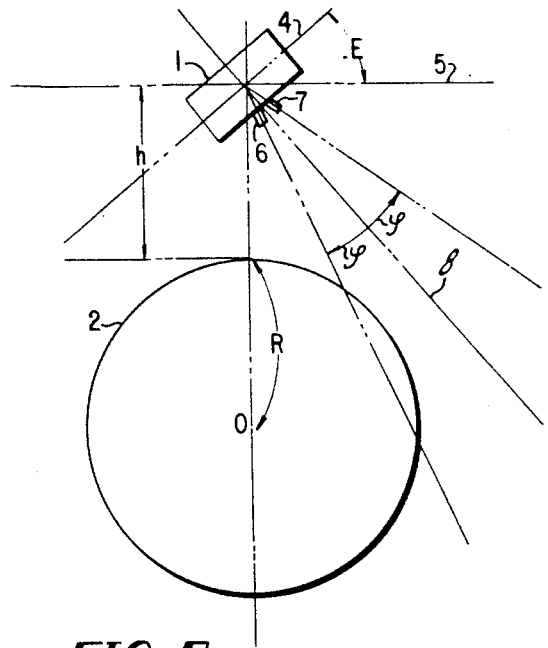
FIG. 5 is a view, in accordance with the present invention, in which the earth is viewed by only one of the pair of sensors on the satellite.

As is clearly shown in FIG. 5, the sensor 6 is mounted on the satellite at an inclination angle $\phi$ with respect to a plane 8. The plane 8 is perpendicular to the spin axis 4 of the satellite 1. Similarly, the sensor 7 is mounted on the satellite at an inclination angle $\phi$ with respect to the plane 8. Thus, both of the aforesaid sensors 6 and 7, which are used for detecting ultraviolet rays from the earth's horizon are separated by one angle $2\phi$.

Referring again to FIG. 4, it is seen that since the angle of inclination E of the spin axis 4 with respect to the horizon 5 is small that both of the sensors 6 and 7 may simultaneously detect rays from the earth's horizon. On the other hand, as shown in FIG. 5, if the angle of inclination E of the spin axis 4 with respect to the horizon 5 is large, then only one sensor, such as sensor 6, may at any given time detect rays from the earth's horizon.

Figure 6:
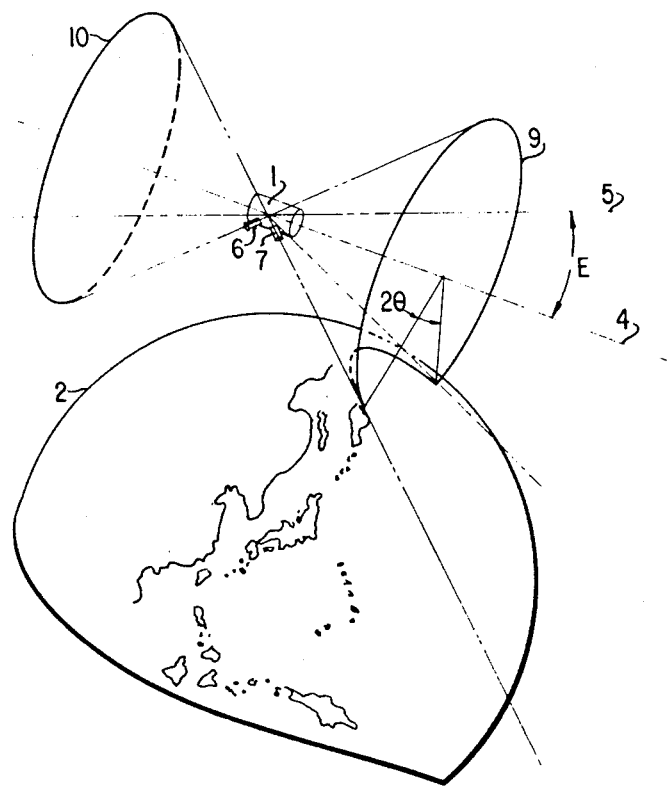
FIG. 6 is a view in which an angle of the earth being viewed by one of sensors of the satellite is shown, FIG. 7 are curves which show the respective viewing angles of the sensors to the inclination angle of the spin axis of the satellite and the difference therebetween, FIG. 8 are curves which show the magnification of the error in the measuring to the inclination angle of the spin axis of the satellite, FIGS. 9 and 10 respectively show block diagrams for counting the outputs from the sensors.

Referring now to FIG. 6 it is seen that the sensor 7 will be able to detect rays from the earth 2 for a view angle of $2\theta$. A circle 9 shows a trace which includes the view point of the sensor 7 on the earth 2. A circle 10 shows a trace of the view point of the sensor 6 which corresponds to the circle 9.

Figure 7:
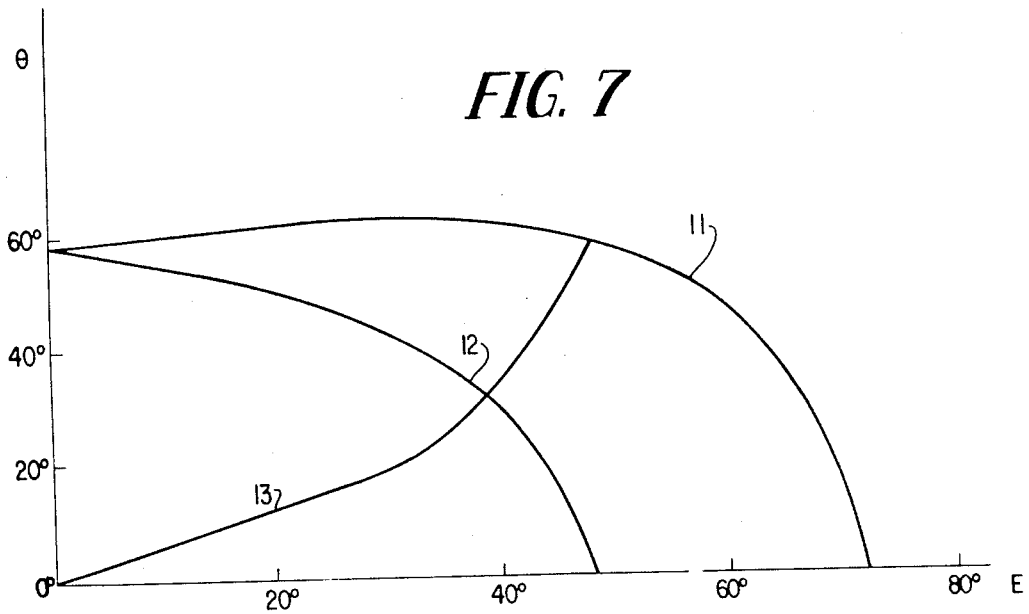

In FIGS. 1, 2, 4, 5 and 6, the angle $\theta$ can be calculated by the following formula:

$$\cos\theta = \frac{\cos\delta - \sin\varphi \sin E}{\cos E \cdot \cos\varphi}$$

wherein,
$2\phi$—is the angle between a pair of sensors
$2\theta$—is the viewing angle of a sensor to the earth $E$ — is the angle of inclination of the spin axis of the satellite to the horizon
$h$ — is the height of the satellite from the earth's surface
$R$ — is the radius of the earth
$\delta$ — is an angle between a line connecting the center of the satellite with the center of the earth and a tangent drawn from the center of the satellite to the surface of the earth
$\sin \delta$ — is equal to $R/R-h$ FIG. 7 shows curves which are representative of typical viewing angles $\theta$ of the pair of sensors 6 and 7 versus the inclination angles E of the spin axis of the satellite. In the example shown the angle between the pair of sensors 6 and 7 was 24° and the satellite was at the height of 1,000 km. The angle between the pair of sensors 6 and 7 is fixed and is determined in accordance with the height of the satellite from the surface of the earth. In FIG. 7, the curve 11 shows the variation of the viewing angle of one of the sensors, such as sensor 6, and the curve 12 shows the variation of the viewing angle $\theta$ of the other sensor, such as sensor 7. The other curve 13 represents the difference between the curves 11 and 12.

Figure 8:
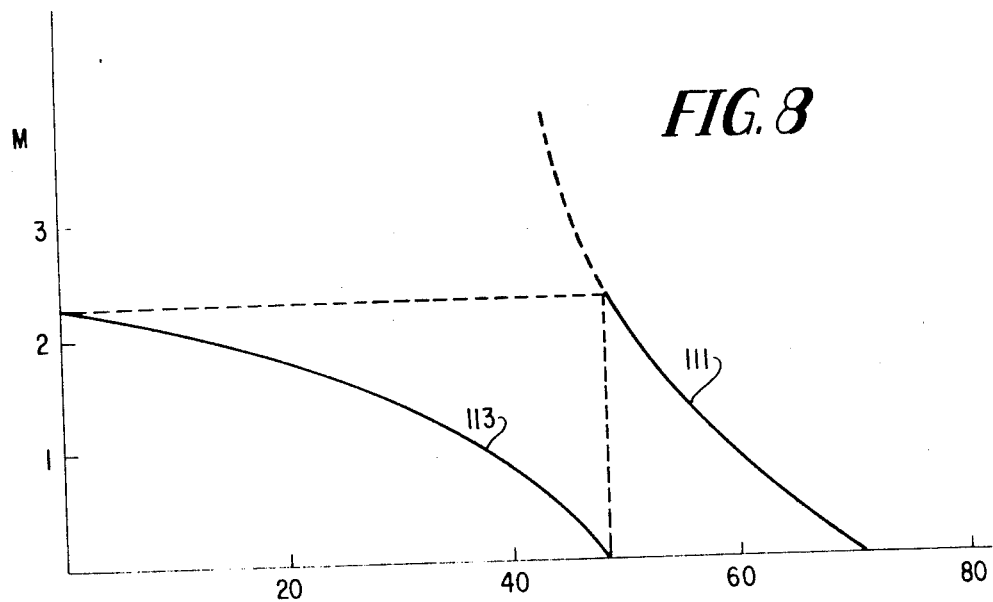

FIG. 8 shows curves which represent the magnification M of the error of the sensors corresponding to the curves as shown in FIG. 7. The curve 111 corresponds to the curve 11 for the sensor 6 in FIG. 7 and the curve 113 corresponds to the curve 13 in FIG. 7 which indicates the difference between the curves 11 and 12.

It can be clearly seen from FIGS. 7 and 8 that when the inclination angle E of the spin axis with respect to the horizon thereof is of a small range that the magnification M of the error will be large. This is because under such conditions the variation of the viewing angle $2\theta$ of the sensors will be in a small range which corresponds to that of the aforesaid inclination angle E of the spin axis.

However, in accordance with the present invention, where the difference between the outputs of both sensors 6 and 7 is utilized as shown in curve 13 of FIG. 7, then the magnification M of the error will be small as shown in curve 113 of FIG. 8.

In the prior art satellites which utilized only one sensor and were located in space at a height such for example as 1,000 km., the magnification M of the error could be reduced to a value less than 3 only in a range of "25°<E<60°," wherein E is the inclination angle of the spin axis of the satellite with respect to the horizon thereof. Moreover, with the single sensor of the prior art satellites it was possible to measure only one-third of all of the inclination angles of the spin axis of the satellite.

It should be apparent, however, that in accordance with the present invention that the magnification M of the error may be reduced to a value less than 3 for all inclination angles selected in a range from 0° to 70°. Moreover, with the use of two sensors with the present invention, it is possible to measure a range including 80 percent of all the inclination angles of the spin axis of the satellite.

Figure 9:
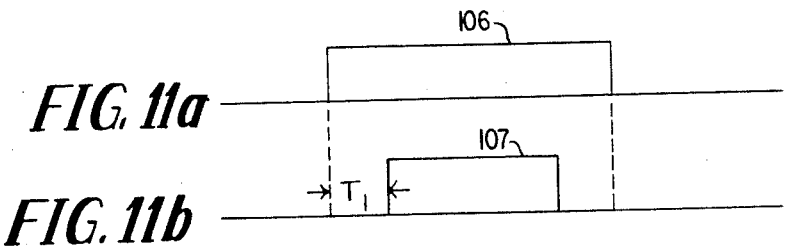
Figure 9:
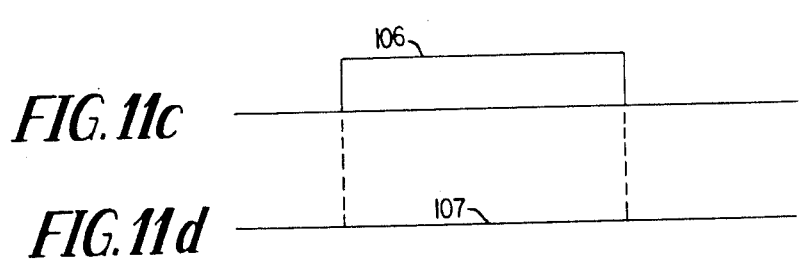
Figure 9:
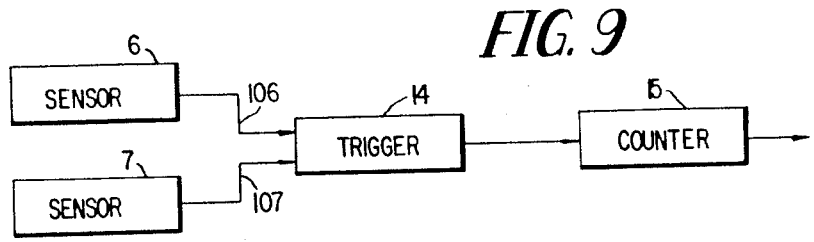

Referring now to FIG. 9, a counter device is therein shown for providing a signal representative of the difference between the outputs of the sensors 6 and 7. When both sensors 6 and 7 are located so as to detect a signal from the earth, the output of the first sensor which detects the earth, such as sensor 6, will cause a trigger circuit 14 to trigger and thereby allow a counter 15 to begin counting. The output of the second sensor, such as sensor 7, upon detection of the earth will cause the trigger circuit 14 to close and thereby stop the operation of the counter 15.

FIG. 11a shows a typical output 106 for the first operated sensor 6 and a typical output 107 for the second operated sensor 7. The counter 15 will function to count the output of the trigger 14 during the time interval $T_1$ which represents the leading edge of the output 106 to the leading edge of the output 107.

The device disclosed in FIG. 9 may be provided within the satellite structure and the output of the counter 15 may be transmitted to the earth by any suitable wireless data transmission system for enabling the same to be analyzed on the earth.

In accordance with the arrangement of FIG. 9, since the counting operation is made only during the time interval $T_1$, namely, that time between the leading edge of the output 106 of the sensor 6 and the leading edge of the output 107 of the sensor 7 and is omitted between the trailing edges of the outputs, both the amount of the data treatment and the number of channels required for transmission is reduced.

In FIGS. 11c and 11d, a typical output condition wherein the output 107 of the sensor 7 is eliminated because of its not being within viewing range of the earth is shown. This condition corresponds to that shown in FIG. 5. In this case, the counter 15 will only count the output 106 from the sensor 6.

As shown in FIGS. 7 and 8, under conditions when both sensors 6 and 7 have outputs generated therefrom the difference of the outputs thereof has been utilized and as a result the magnification of the error has been reduced to a lower level, as shown by the curve 113. Under the conditions when only one of the sensors is within viewing range of the earth, the magnification of the error will be represented by the solid line portion of the curve 111 of FIG. 8 and the same will again show a lower level of error because of the larger inclination angle of the spin axis of the satellite.

Figure 10:
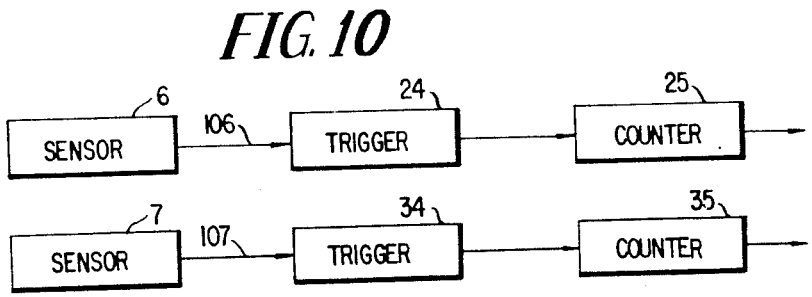

In FIG. 10 an arrangement is shown wherein the outputs of the pair of sensors 6 and 7 are treated separately within the satellite. An output from the sensor 6 will cause a trigger 24 to turn on and off and in turn cause a counter 25 to start and stop. Similarly, the output of the sensor 7 will cause a trigger 34 to turn on and off and in turn cause a counter 35 to start and stop. The contents in the counters 25 and 35 may then be separately transmitted to the earth and treated as shown in FIG. 11.

Obviously, numerous modifications and variations of the present invention are possible in light of the above teachings. It is therefore to be understood that within the scope of the appended claims the invention may be practiced otherwise than as specifically described herein.

What is claimed as new and intended to be secured by Letters Patent of the United States is:

1. A apparatus for detecting the attitude of an artificial satellite which comprises;
   a pair of sensors mounted on a sidewall of an artificial satellite, said sensors being mounted on the satellite such as to provide a predetermined angle therebetween for viewing the earth, said angle being determined in accordance with the height of the satellite from the earth surface, and
   means for detecting a difference in the outputs from said pair of sensors for enabling an angle of inclination of a spin axis of the satellite to the horizon thereof to be detected for providing the satellite attitude.

2. An apparatus for detecting the attitude of an artificial satellite according to claim 1, wherein:
   the outputs of said pair of sensors are treated such that when one of the same is eliminated the other will be employed for detecting the angle of inclination of the spin axis of the satellite to the horizon thereof.

3. An apparatus for detecting the attitude of an artificial satellite according to claim 1, wherein:
   the output levels of said pair of sensors, when the inclination angle of the spin axis of the satellite to the horizon thereof is near zero degrees, are selected to be substantially equal to the output level of one sensor at the time when the earth is out of sight of the other sensor.

4. An apparatus for detecting the attitude of an artificial satellite according to claim 1, wherein:
   said means for detecting a difference in the outputs from said pair of sensors includes a counting device, and
   said counting device being enabled to count only during a time interval from the leading edge of the output of one of said pair of sensors to the leading edge of the output of the other one of said pair of sensors.

* * * * *